US012767049B2

(12) United States Patent
Bosma et al.

(10) Patent No.: US 12,767,049 B2
(45) Date of Patent: Oct. 20, 2026

(54) FULL DISPLAY SYSTEM WITH INTERPOSED CONTROLLER FOR MULTIPLE CAMERAS

(71) Applicant: Gentex Corporation, Zeeland, MI (US)

(72) Inventors: Bradley A. Bosma, Hudsonville, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 410 days.

(21) Appl. No.: 18/071,763

(22) Filed: Nov. 30, 2022

(65) Prior Publication Data

US 2023/0166662 A1 Jun. 1, 2023

Related U.S. Application Data

(60) Provisional application No. 63/284,712, filed on Dec. 1, 2021.

(51) Int. Cl.

| | |
|---|---|
| ***B60R 1/22*** | (2022.01) |
| ***H04N 5/265*** | (2006.01) |
| ***H04N 7/18*** | (2006.01) |
| ***H04N 23/90*** | (2023.01) |

(52) U.S. Cl.

CPC ............... *B60R 1/22* (2022.01); *H04N 5/265* (2013.01); *H04N 7/181* (2013.01); *H04N 23/90* (2023.01); *B60R 2300/30* (2013.01)

(58) Field of Classification Search

None

See application file for complete search history.

(56) References Cited

U.S. PATENT DOCUMENTS

2013/0314503 A1* 11/2013 Nix ........................ G06V 20/58 348/46
2017/0190292 A1 7/2017 Xu et al.
2017/0217372 A1 8/2017 Lu et al.
2019/0100156 A1 4/2019 Chung et al.
2021/0201447 A1 7/2021 Jung et al.
2022/0141383 A1* 5/2022 Freeman-Powell .......................... H04N 23/665 348/148
2023/0136285 A1* 5/2023 Chujo .............. G08G 1/096741 370/329
2023/0166662 A1* 6/2023 Bosma ...................... B60R 1/26 348/148

FOREIGN PATENT DOCUMENTS

KR 100561692 B1 3/2006
KR 102027220 B1 10/2019

* cited by examiner

*Primary Examiner* — Samira Monshi
(74) *Attorney, Agent, or Firm* — Price Heneveld LLP; Brian James Brewer

(57) ABSTRACT

A display system for a vehicle includes a first camera in connection with the vehicle. The first camera outputs unprocessed image data. A second camera outputs a first processed image data. A display controller is in communication with the first camera via a conductive interface and the second camera via a wireless interface. The controller is configured to receive the unprocessed image data from the first camera and receive the first processed image data from the second camera. The controller further generates second processed image data from the unprocessed image data and selectively outputs the first processed image data and the second processed image data to a vehicle display device.

19 Claims, 4 Drawing Sheets

FULL DISPLAY SYSTEM WITH INTERPOSED CONTROLLER FOR MULTIPLE CAMERAS

CROSS-REFERENCE TO RELATED APPLICATIONS

This application claims priority under 35 U.S.C. § 119(e) and the benefit of U.S. Provisional Application No. 63/284,712 entitled Full Display System With Interposed Controller for Multiple Cameras, filed on Dec. 1, 2021, by Bosma et al., the entire disclosure of which is incorporated herein by reference.

FIELD OF THE DISCLOSURE

The present invention generally relates to an in-vehicle imaging system with an external, wireless camera, and, more particularly, an interface for a display system configured to receive multiple image feeds.

SUMMARY OF THE DISCLOSURE

According to one aspect of the present disclosure, a display system for a vehicle includes a first camera in connection with the vehicle. The first camera outputs unprocessed image data. A second camera outputs a first processed image data. A display controller is in communication with the first camera via a conductive interface and the second camera via a wireless interface. The controller is configured to receive the unprocessed image data from the first camera and receive the first processed image data from the second camera. The controller further generates second processed image data from the unprocessed image data and selectively outputs the first processed image data and the second processed image data to a vehicle display device.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
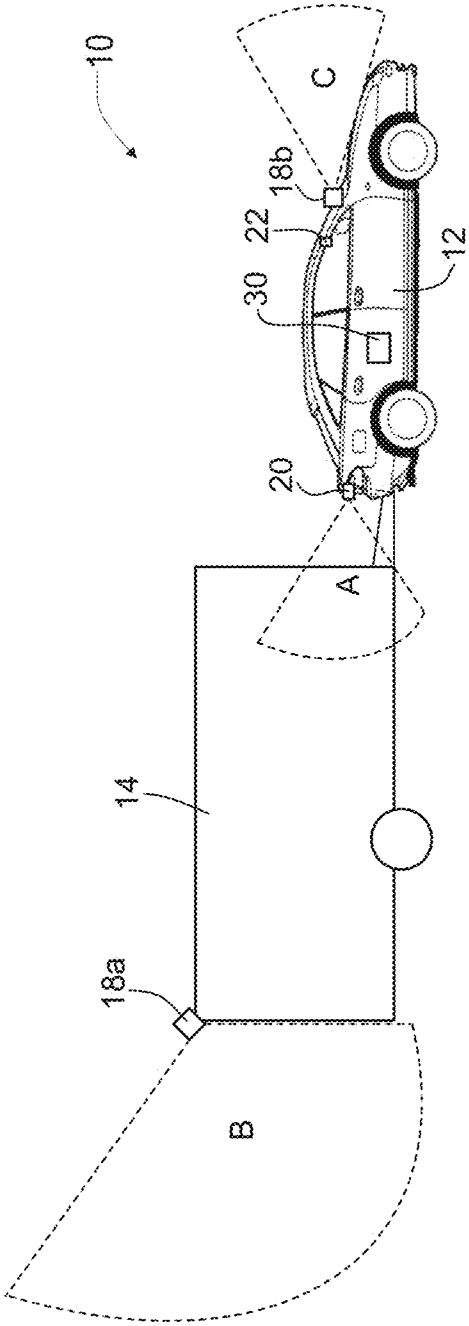
FIG. 1 is a side view of a vehicle and trailer incorporating an imaging and display system.

The present illustrated embodiments reside primarily in combinations of method steps and apparatus components related to an imaging and display system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-5 show an example of a display system 10 implemented in a vehicle 12 and a trailer 14. Though demonstrated as implemented with the vehicle 12 and trailer 14 in combination, it shall be understood that the display system may be implemented in a variety of applications, which typically may include at least one wired or local camera 16 as well as one or more wireless or portable cameras 18. A local camera 16 may correspond to a forward or reverse navigational display camera of the vehicle 12, which may be in communication with a display controller 20 via a hard wired communication interface (e.g., coaxial, HDMI, etc.). Each of the one or more wireless cameras 18 may be in communication with the display controller 20 via a wireless communication protocol (e.g. Wi-Fi, 5G, etc.).

Figure 2:
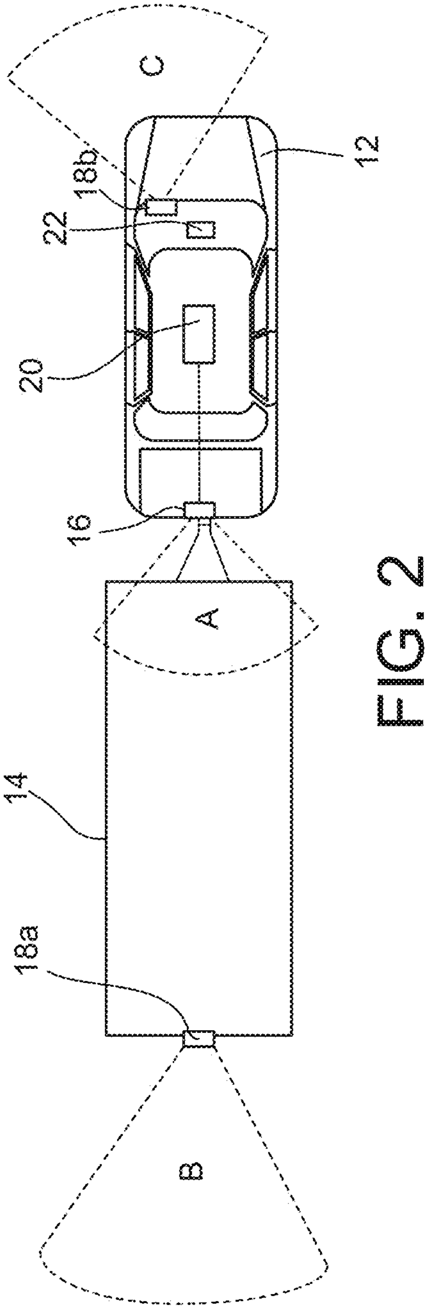
FIG. 2 is a top view of the vehicle and trailer of FIG. 1.

As demonstrated in FIGS. 1-2, the local camera 16 is in connection with a rearward directed portion of the vehicle 12 having a field of view A directed behind the vehicle 12. Additionally, a first wireless camera **18*a* is demonstrated in connection with a rearward directed portion of the trailer 14, and a second wireless camera 18*b* is demonstrated in connection with the forward directed portion of the vehicle 12. In this configuration, the first wireless camera 18*a* may capture image data in a second field of view B directed behind the trailer 14 and the second wireless camera 18*b* may capture image data in a third field of view C forward of the vehicle 12. For clarity, the image data captured by each of the local cameras 16 and wireless cameras 18 may be referred to as local image data and wireless image data, respectively. Further, the position of each of the wireless cameras 18, as well as the local cameras 16, may be adjusted for connection with various portions of the vehicle and/or separated for detached configurations as exemplified by the connection to the trailer 14. For example, in some implementations, the display system 10 may receive image data from one or more local cameras 16 or wireless cameras 18 with fields of view directed into the passenger compartment (e.g. passenger seating area, cargo area, etc.) of the vehicle 12. Accordingly, the display system 10 may provide for nearly limitless configurations that may combine the implementation of at least one local camera 16 and a wireless camera 18**, further examples of which are described in the following detailed description.

Figure 3:
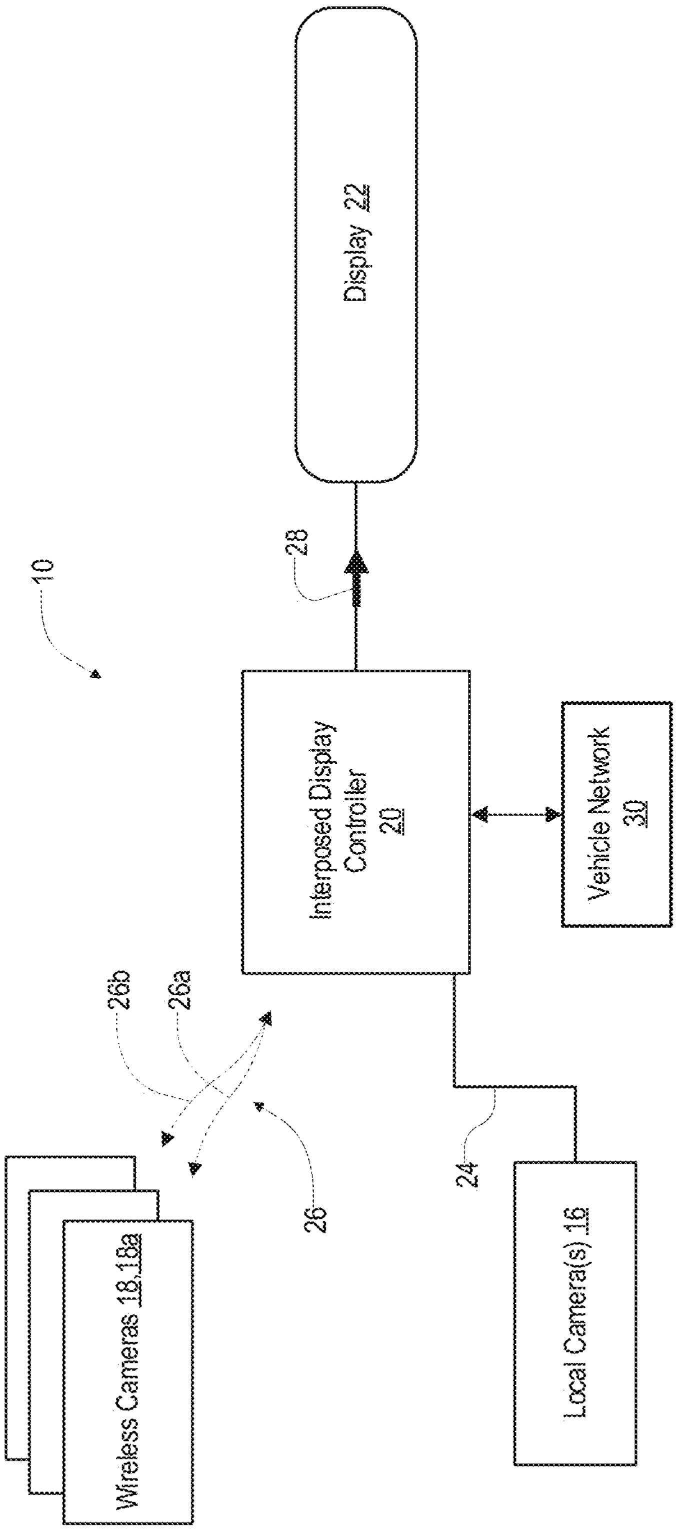
FIG. 3 is a simplified block diagram of a display system for a plurality of cameras.

As demonstrated in FIG. 3, the display controller 20 may correspond to an interposed display controller, which may be positioned between the local camera 16 and a display device 22 of the vehicle 12. In this configuration, the display controller 20 may be in communication with the local camera 16 via a wired communication interface 24 and may be in communication with one or more wireless cameras 18 by corresponding wireless interfaces 26. In the specific example demonstrated, a first wireless interface 26*a* may provide for communication with the first wireless camera 18*a* and a second wireless interface 26*b* may provide for communication with the second wireless camera 18*b*. In operation, image data received from each of the cameras 16, 18 may be received in one or more formats which may require processing to convert formatting, adjust tone, color, and/or brightness, combine high dynamic range image frames, and various image processing steps that may be required to supply display data 28 to the display 22. Accordingly, the display controller 20 may serve to process and adjust the compatibility of the image data received from each of the cameras 16, 18 and may further be in communication with a vehicle network 30 of the vehicle 12 to adjust and control the proportions and selected one or more image feeds of the image data to display on the display device 22. The proportions and/or selected image feed for the display data 28 may be selected by the display controller 20 based on a mode of operation or setting of the vehicle 12 or the display device 22.

As previously discussed, the image data received from the cameras 16, 18 may include both processed image data and raw image data. For example, raw image data may be captured by the local camera 16 and communicated to the display controller 20 via the wired interface 24. The processed image data may correspond to video image data encoded via one or more color models (e.g., RGB565, RGB888, YUV444, YUV442, etc.) and/or compressed via one or more video compression standards or codecs (e.g., H.264—Advanced Video Coding (AVC), H.265—High Efficiency Video Coding (HEVC), H.266—Versatile Video Coding (VVC), etc.). The processing of the processed image data in relation to the color encoding and/or the codec compression may be processed by the wireless camera(s) 18 and communicated to the display controller 20 via the wireless interface(s) 26. The processed image data may be generated from raw image frames captured by one or more of the cameras 18*a*, 18*b* as discussed in reference to the wireless cameras 18 in the exemplary embodiment. Accordingly, the processed image data may be generated by one or more image signal processors (ISP) and/or encoders of the wireless camera(s) 18 prior to communication to the display controller 20 via the wireless interface(s) 26.

In various examples, the processed image data may be both encoded or color encoded as well as compressed by a digital video codec prior to transmission over the wireless interface 26. For example, the processed image data, first encoded via a color model (e.g., encoded image data in YUV444) may further be compressed and coded via one or more video compression standards or codecs. The video compression codec may provide block-oriented, motion-compensated, motion vector prediction, intra-frame, or various forms of video compression. For clarity, the encoding and compression of the image data communicated from the wireless camera(s) 18 may be referred to as encoded and compressed image data, where encoding refers to the color model encoding (e.g., RGB565, RGB888, YUV444, YUV442, etc.) and the compression refers to the motion-compensated, block-oriented, or similar video compression standards or codecs (e.g., H.264, H.265, H.266, etc.).

In cases where the processed image data is encoded via a color model and compressed via a compression standard, the controller 20 may initially decompress the processed image data, such that the image frames received from the wireless camera(s) 18 may be accessed in the color model encoded standard (e.g., RGB565) and combined with the unprocessed image data. Stated another way, the processed image data that was encoded (e.g., via RGB565) and compressed (e.g., via H.264) by the wireless camera(s) 18 prior to transmission to the controller 20 may be received wirelessly and decompressed to an encoded image data format that is decompressed via a codec of the controller 20. The decompressed format of the processed image data (e.g., decompressed from H.264) may still be encoded (e.g., RGB565) following decompression by the controller 20. Once decompressed, the encoded image data may be selectively combined with frames or portions of image frames from the raw or unprocessed image data from the local camera 16 as discussed herein. Accordingly, the processed image data may be referred to as being encoded or color encoded in relation to the encoding via a color model and may also be referred to as being compressed via a video codec or digital compression method as distinct steps in relation to the processing of the processed image data.

In contrast with the processed image data, the raw or unprocessed image data may be directly communicated to the display controller 20 as a stream of unprocessed image frames that must be processed by an image signal processor of the display controller 20. The unprocessed image data may correspond to a readout of pixel data corresponding to each frame of a series of images that may be stored in a buffer and output as sequentially captured, raw image frames. The raw images may be uncompressed and include the image capture information natively captured by an imager of the local camera. In this way, the display system 10 may provide for the display data 28 to be processed by the display controller 20 from both the local cameras 16 and the one or more wireless cameras 18, even in cases where the image data received from the cameras 16, 18 is supplied in a variety of formats.

Figure 4:
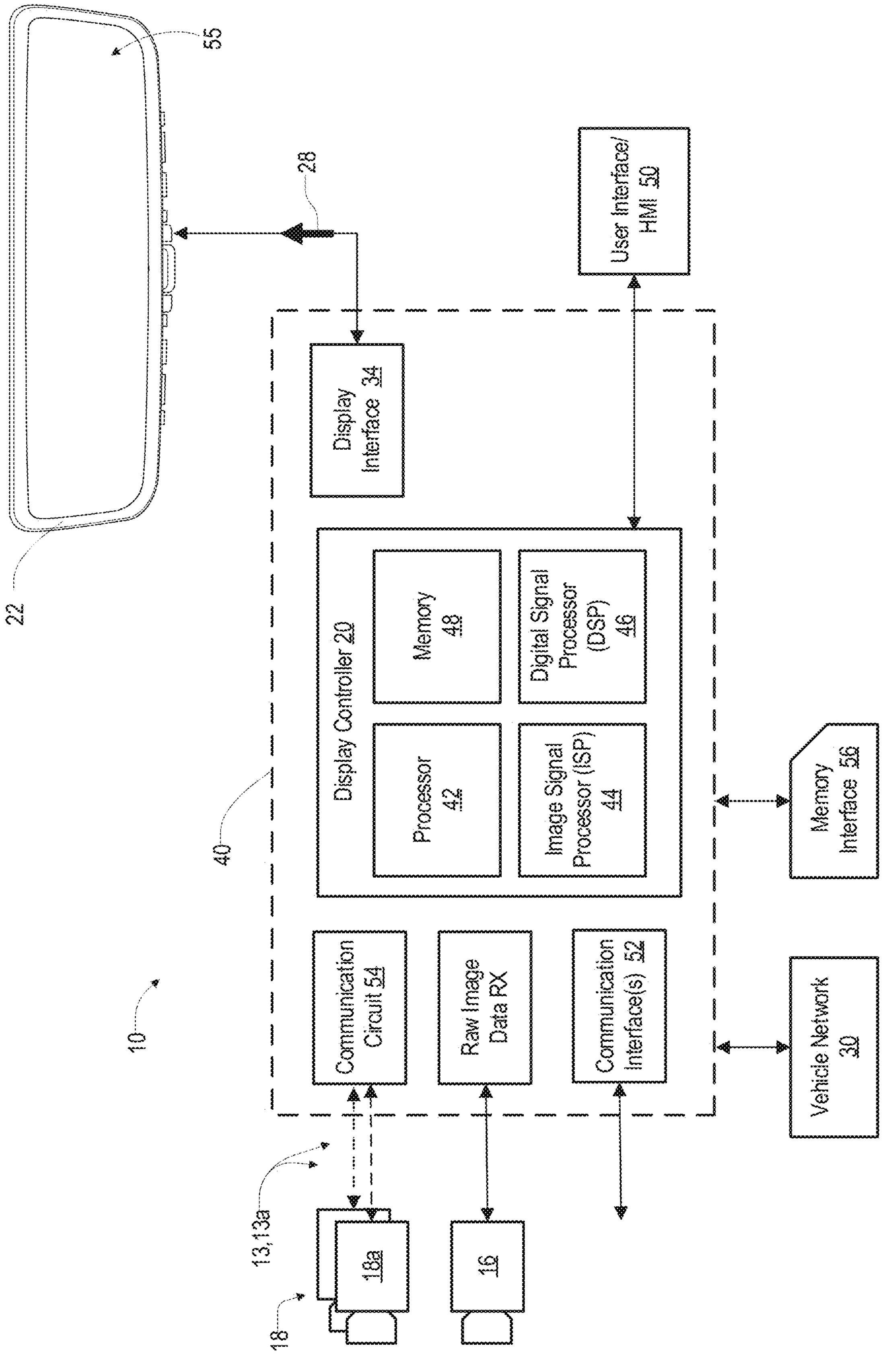
FIG. 4 is a block diagram of a display controller for a display system for a plurality of cameras.

Referring now to FIG. 4, a pictorial block diagram of the display controller 20 is shown demonstrating further details of the display system 10. As shown, the display controller 20 may be implemented as an integrated control circuit 40, sometimes referred to as a system on a chip (SoC). The controller 20 may include various types of control circuitry, digital and/or analog, and may include a microprocessor, microcontroller, application-specific integrated circuit (ASIC), or other circuitry configured to perform various input/output, control, analysis, and other functions. In the example shown, the controller 20 comprises processor 42, an image signal processor (ISP) 44, and a digital signal processor 46. The processor 42 may be configured to implement one or more operating routines that may be stored in a memory. The memory may comprise a variety of volatile and non-volatile memory formats, for example, random access memory. Accordingly, the controller 20 may provide for the processing of the image data from the cameras 16, 18 via the image signal processor (ISP) 44 and the digital signal processor (DSP) 46, and may control the operation of the display device 22 via the processor 42 in response to instructions or inputs received from the vehicle network 30, a user interface 50, and/or addition communication or peripheral interfaces 52.

As previously discussed, the image data from the cameras 16, 18 may be received in a variety of processed and/or raw image formats. In operation, ISP 44 may be configured to process the raw image data, which is received from the local camera 16 via the wired communication interface 24. Once received, the ISP 44 may process the image data to create a video display stream suitable for communication as display data 28 to the display device 22. Examples of processing of the raw image data may include formatting, adjustment of tone, color, and/or brightness, combining high dynamic range image frames, and various image processing steps that may be required to supply display data 28 to the display 22. The DSP 46 may receive and convert the processed video signals from the wireless cameras 18 as well as the ISP 44 and process the image data, such that it is in a format (e.g., resolution, combination, etc.) compatible with the display 22. In some implementations, one or more of the local cameras 16 may include an integrated ISP similar to the wireless cameras 18 as previously discussed. In such cases, the controller 20 may receive the processed image data from the integrated ISP included in the local camera 16 and supply the processed image data to the DSP 46. Once the processed image data is received, the DSP 46 may manipulate the digitized image data to conform to a display format suitable to the display device 22 and may also combine image feeds from each of the cameras 16, 18 to be displayed over one or more portions of a screen 55 of the display device 22. In this way, the controller 20 may process and combine the image data from a variety of diverse sources in a variety of formats for display on the screen 55.

Combining the processed image data with the raw or unprocessed image data may require an initial decompression step, wherein the processed (e.g., encoded and compressed) image data may be decompressed by the controller 20. For example, the image data captured by the wireless camera(s) 18 may be processed by first encoding the image data based on a color model (e.g., RGB565, RGB888, YUV444, YUV442, etc.). Additionally, the processed image data (e.g., encoded image data in YUV444) may further be compressed and coded via one or more video compression standards or video codecs by the wireless camera(s) 18 (e.g., H.264—Advanced Video Coding (AVC), H.265—High Efficiency Video Coding (HEVC), H.266—Versatile Video Coding (VVC), etc.). In cases where the processed image data is both encoded via a color model and compressed via a compression standard or codec, the controller 20 may initially decompress the processed image data, such that the image frames received from the wireless camera(s) 18 may be accessed in the color model encoded standard (e.g., RGB565). Once decompressed, the processed image data in the color encoded format may be combined with the unprocessed image data. For example, the decompressed, color encoded image data associated with the individual image frames captured by the wireless camera(s) 18 in the color-encoded format may be accessed and combined with frames or portions of frames from the raw or unprocessed image data to generate a hybrid or combined image feed from diverse data sources (e.g., the local camera 16 and wireless camera(s) 18). As previously described, the processed image data may be referred to as being encoded or color encoded in relation to the encoding via a color model and may be referred to as being compressed via a video codec or digital video compression standard as distinct steps in relation to the processing of the processed image data.

The controller 20 may be coupled to the user interface 50, which may comprise one or more switches, but may alternatively include other user input devices, such as a touch-screen interface, switches, knobs, dials, alpha or numeric input devices, etc. Additionally, the display controller 20 and/or the system 10 may comprise sensors or inputs that may be implemented in the vehicle 12 (e.g., microphone, motion sensors, etc.). Data received by each of the sensors or scanning apparatuses may be processed by the processor 42 of the controller 20 to provide further beneficial features to support the operation of the vehicle 12.

As discussed herein, the display controller 20 may be in communication with a variety of vehicle systems. For example, the display controller 20 is shown in communication with the vehicle control system via the vehicle network 30 (e.g., communication bus). Additionally, the controller 20 may be in communication with a plurality of vehicle systems via one or more input-output (I/O) circuits represented in FIG. 4 as the communication interface 52. The communication interface 52 may further provide for diagnostic access to the controller 20, which may be beneficial for programming and manufacture of the controller 20. As previously discussed, the controller 20 may be in communication with the wireless camera(s) 18 via the wireless interface 26. The wireless interface 26 may be implemented via one or more communication circuits 54. The wireless interface 26 may correspond to various forms of wireless communication, for example 5G, wireless local area network (WLAN) technology, such as 802.11 Wi-Fi and the like, and other radio technologies as well. The communication circuit(s) 54 may further be configured to communicate with a remote server, which is not shown (e.g. a manufacturer firmware server via a cellular data connection), and/or any device compatible with the wireless interface 26.

The controller 20 may further provide for the recording of the display data 28 and/or the image feeds from the cameras 16, 18 individually or concurrently. For example, the controller 20 may provide for digital video recorder (DVR) functionality to record image data from one or more of the cameras 16, 18 in response to an input received via the user interface 50. Additionally, in order to provide easy access to image data stored DVR recording of video, the controller 20 may include a memory interface 56 configured to access/store information on various forms of removable storage media (e.g., SD, microSD, etc.). In this way, the controller 20 may provide for the capture, conversion, and recording of image data concurrently received from multiple source and in various processed or raw video formats.

Figure 5B:
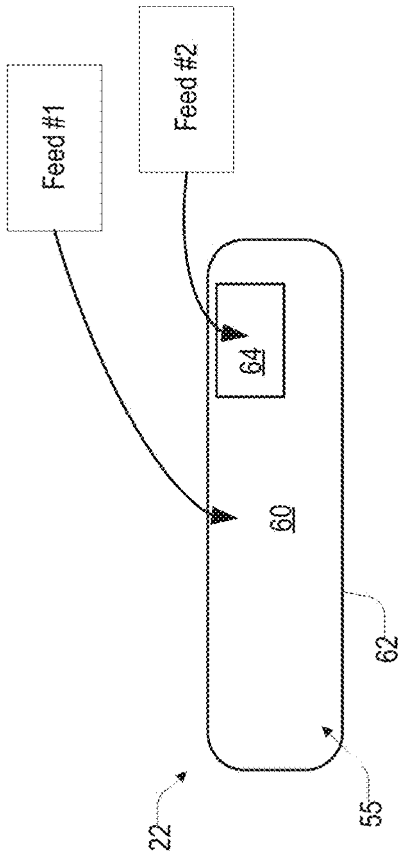
FIG. 5B is a schematic representation of a display in a second display configuration.
Figure 5A:
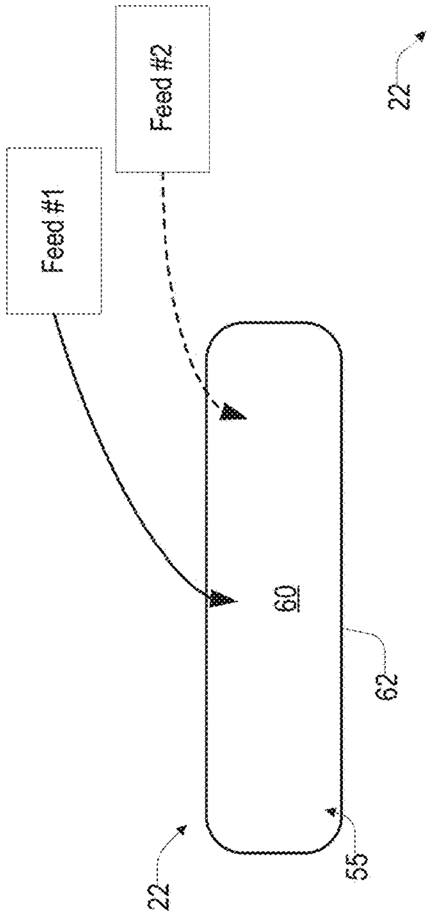
FIG. 5A is a schematic representation of a display in a first display configuration.
Figure 5C:
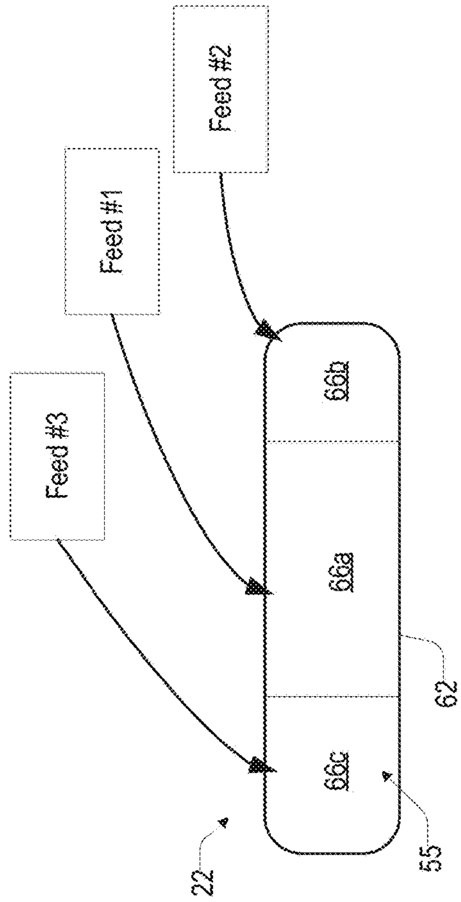
FIG. 5C is a schematic representation of a display in a third display configuration.

Referring now to FIGS. 5A, 5B, and 5C; examples of image data supplied one or more of the cameras 16, 18 in the display data 28 are shown. As shown, the image data is represented as a first feed, second feed, and a third feed captured by each of the cameras 16, 18. In addition to adjusting the resolution and combining the feeds of processed image data, the DSP 46 may adjust the video feeds from the cameras 16, 18 in a variety of configurations. One or more of the formats may be adjusted by the display controller 20 in response to communication indicating a state of the vehicle 12 (e.g., forward, reverse, idle, etc.) via the vehicle network 30. As shown in FIG. 5A, the display controller 20 may selectively supply the display data 28 associated with each of the local cameras 16 and/or wireless cameras 18 individually, such that a full screen representation of the corresponding display data 28 is displayed over the extent of the screen 55.

As depicted in FIG. 5B, the display controller 20 may supply the display data 28 to the display device 22 in the form of two concurrent video feeds. As represented in the example shown, a first video feed may be displayed over a full display section 60, which may extend across a surface of the screen 55 to a perimeter edge 62 of the display 22. In addition to the first feed, a second feed may be communicated in the display data 28 and depicted in the screen 55 within a superimposed window 64 that may overlap and occupy an interior segment of the full display section 60 of the display device 22. For example, the superimposed window 64 may correspond to a picture-in-picture (PIP) superposition of the second video feed over the first video feed. To be clear, the first video feed may correspond to processed image data from the local camera and the second video feed may correspond to processed image data from the wireless camera 18.

As depicted in FIG. 5C, a plurality of video feeds may be incorporated in the display data 28 for display on the display device 22 by the display controller 20. More specifically, a first video feed associated with the local camera 16 may be presented in a first segment 66*a* of the screen 55. A second video feed associated with the first wireless camera 18*a* may be presented in a second segment 66*b* of the screen 55. Additionally, a third video feed associated with the second wireless camera 18*b* may be presented in a third segment 66*c* of the screen 55. Each of the screen segments 66 may be positioned within the display data 28 and formatted, such that the corresponding information captured by the multiple local and wireless cameras 16, 18 (e.g., in this case, three total cameras) are demonstrated on adjacent portions of the screen 55. Depending on the application, the display controller 20 may adjust a relative proportion of the screen 55 over which each of the superimposed windows 64 or screen segments 66 are represented in the image data.

Accordingly, the disclosure provides for a system 10 comprising a display controller 20 configured to combine unprocessed or raw image data with processed image data from multiple wired and wireless cameras. In some cases, the display controller 20 may provide for the implementation of one or more wireless camera in combination with a wired or local camera incorporated in the vehicle 12.

In various implementations, the disclosure provides for a display system for a vehicle comprising a first camera in connection with the vehicle, wherein the first camera is configured to output unprocessed image data. A second camera is configured to output a first processed image data. A display controller is in communication with the first camera via a conductive interface and the second camera via a wireless interface. The controller is configured to receive the unprocessed image data from the first camera, receive the first processed image data from the second camera, and generate second processed image data from the unprocessed image data. The controller is further configured to selectively output the first processed image data and the second processed image data.

The following features or methods steps may be implemented in various embodiments of the disclosed subject matter alone or in various combinations:

- the controller is further configured to selectively combine the first processed image data and the second processed image data into a combined video stream output to a display device;
- a display device in connection with the vehicle and in communication with the display controller via a display interface;
- the display controller is interposed between the display device and the first camera along the conductive interface;
- the display controller further comprises a first processing circuit configured to generate the second processed image data; and a second processing circuit configured to control the output of the first processed image data and the second processed image data to a display device of the vehicle;
- the first processing circuit is an image signal processor (ISP) and the second processing circuit is a digital signal processor (DSP);
- the conductive interface connection is a wired connection;
- the unprocessed image data comprises first raw image data captured by the first camera;
- the processed data comprises encoded image data converted from second raw image data captured by the second camera; and/or
- the unprocessed image data is directly communicated to the display controller as a raw stream of unprocessed image frames.

In various implementations, the disclosure provides for a method for displaying image data in a vehicle from a plurality of cameras. The method comprises capturing first unprocessed image data with a local camera and receiving the unprocessed image data from the local camera. The method further comprises wirelessly receiving the first encoded image data with a display controller and generating second encoded image data from the unprocessed image data with the display controller. The first processed image data and the second processed image data are selectively combined output as a combined video stream to a display device.

The following features or methods steps may be implemented in various embodiments of the disclosed subject matter alone or in various combinations:

- the combined video stream is output to a vehicle display via a display interface;
- the encoded image data is captured by a remote camera;
- capturing second unprocessed image data via the remote camera; and generating first encoded image data from the second unprocessed image data;
- wirelessly communicating the first encoded image data to the display controller;
- generating the second processed image data via an image signal processor (ISP) of the display controller;
- controlling the output of the combined video stream via a digital signal processor (DSP) of the display controller;
- the unprocessed image data is received from the local camera via a wired interface; and/or
- the unprocessed image data is directly communicated to the display controller as a raw stream of unprocessed image frames.

In various implementations, the disclosure provides for a display system for a vehicle comprising a first camera in connection with the vehicle, wherein the first camera is configured to output unprocessed image data. A second camera is configured to output a first processed image data. A display controller is in communication with the first camera via a conductive interface and the second camera via a wireless interface. The controller is configured to receive the unprocessed image data from the first camera. The unprocessed image data is directly communicated to the display controller as a raw stream of unprocessed image frames. The controller is further configured to receive the first processed image data from the second camera, generate second processed image data from the unprocessed image data, and selectively combine the first processed image data and the second processed image data into a combined video stream output to a display device. The display device is in connection with the vehicle and in communication with the display controller via a display interface.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the Doctrine of Equivalents.

What is claimed is:

1. A display system for a vehicle comprising:

a first camera in connection with the vehicle, wherein the first camera is configured to output unprocessed image data;

a second camera configured to output a first processed image data; and a display controller in communication with the first camera via a conductive interface and the second camera via a wireless interface, wherein the controller is configured to:

receive the unprocessed image data from the first camera;

receive the first processed image data from the second camera;

decompress the first processed image data received via the wireless interface;

generate second processed image data from the unprocessed image data;

selectively combine frames or portions of image frames from the second processed image data with the first processed image data; and selectively output the first processed image data and the second processed image data into a combined video stream comprising the combined frames or portions of image frames to a display device.

2. The system according to claim 1, further comprising:

a display device in connection with the vehicle and in communication with the display controller via a display interface.

3. The system according to claim 2, wherein the display controller is interposed between the display device and the first camera along the conductive interface.

4. The system according to claim 1, wherein the display controller further comprises:

a first processing circuit configured to generate the second processed image data; and a second processing circuit configured to control the output of the first processed image data and the second processed image data to a display device of the vehicle.

5. The system according to claim 4, wherein the first processing circuit is an image signal processor (ISP) and the second processing circuit is a digital signal processor (DSP).

6. The system according to claim 1, wherein the conductive interface connection is a wired connection.

7. The system according to claim 1, wherein the unprocessed image data comprises first raw image data captured by the first camera.

8. The system according to claim 7, wherein the first processed image data comprises encoded image data converted from second raw image data captured by the second camera.

9. The system according to claim 7, wherein the unprocessed image data is directly communicated to the display controller as a raw stream of unprocessed image frames.

10. A method for displaying image data in a vehicle from a plurality of cameras, the method comprising:

capturing first unprocessed image data with a local camera;

receiving the first unprocessed image data from the local camera;

wirelessly receiving a first encoded image data compressed for transmission with a display controller;

decompressing the first encoded image data;

generating second encoded image data from the first unprocessed image data with the display controller;

selectively combining frames or portions of image frames of the first encoded image data and the second encoded image data into a combined video stream; and selectively outputting the combined video stream to a display device as the combined frames or portions of image frames.

11. The method according to claim 10, wherein the combined video stream is output to a vehicle display via a display interface.

12. The method according to claim 10, wherein the first encoded image data is captured by a remote camera.

13. The method according to claim 12, further comprising:

capturing second unprocessed image data via the remote camera; and generating the first encoded image data from the second unprocessed image data.

14. The method according to claim 13, further comprising:

compressing the first encoded image data for wireless transmission; and wirelessly communicating the first encoded image data to the display controller.

15. The method according to claim 10, further comprising:

generating the second encoded image data via an image signal processor (ISP) of the display controller.

16. The method according to claim 10, further comprising:

controlling the output of the combined video stream via a digital signal processor (DSP) of the display controller.

17. The system according to claim 10, wherein the unprocessed image data is received from the local camera via a wired interface.

18. The system according to claim 10, wherein the unprocessed image data is directly communicated to the display controller as a raw stream of unprocessed image frames.

19. A display system for a vehicle comprising:

a first camera in connection with the vehicle, wherein the first camera is configured to output unprocessed image data;

a second camera configured to output a first processed image data; and a display controller in communication with the first camera via a conductive interface and the second camera via a wireless interface, wherein the controller is configured to:

receive the unprocessed image data from the first camera, wherein the unprocessed image data is directly communicated to the display controller as a raw stream of unprocessed image frames;

receive the first processed image data compressed for wireless transmission from the second camera;

decompress the first processed image data received via the wireless interface;

generate second processed image data from the unprocessed image data;

selectively combine frames or portions of image frames of the first processed image data and the second processed image data into a combined video stream; and selectively output the combined video stream as the combined frames or portions of image frames to a display device, wherein the display device is in connection with the vehicle and in communication with the display controller via a display interface.

* * * * *